No. 607,886. Patented July 26, 1898.
W. SCHUBERT.
CARRIAGE SPRING.
(Application filed Aug. 3, 1897.)
(No Model.)
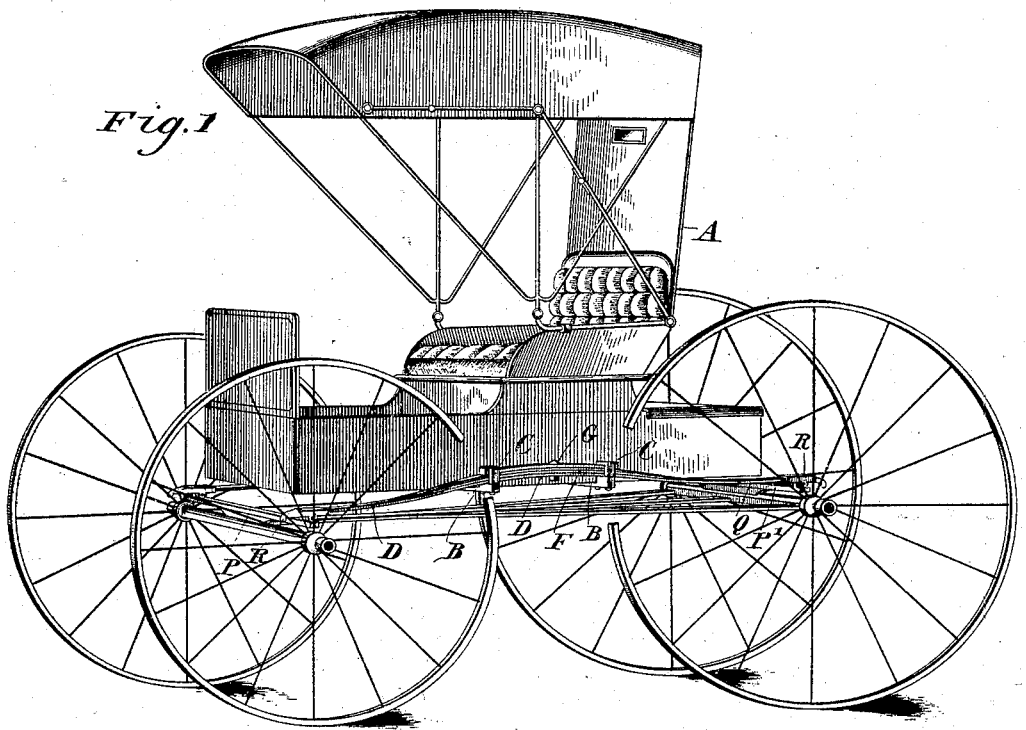
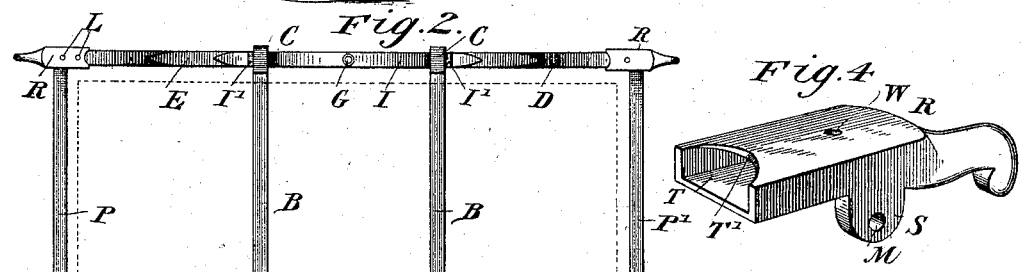
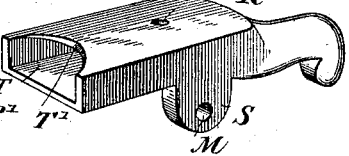
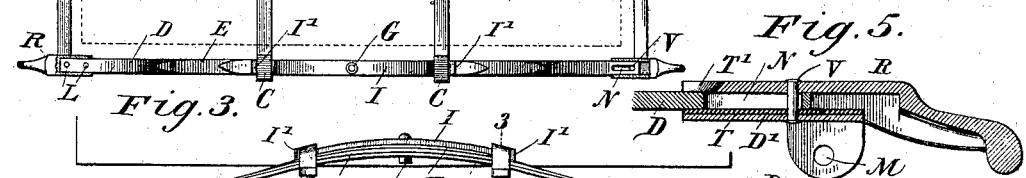
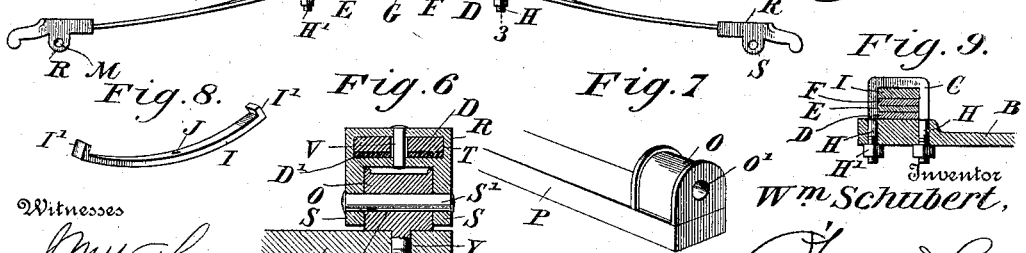
Witnesses
Inventor
Wm. Schubert,
by Meara & Co.
Attorneys

UNITED STATES PATENT OFFICE.

WILLIAM SCHUBERT, OF ONEIDA, NEW YORK.

CARRIAGE-SPRING.

SPECIFICATION forming part of Letters Patent No. 607,886, dated July 26, 1898.

Application filed August 3, 1897. Serial No. 646,987. (No model.)

*To all whom it may concern:*

Be it known that I, WILLIAM SCHUBERT, residing at Oneida, in the county of Madison and State of New York, have invented a new and useful Carriage-Spring and Coupling Therefor, of which the following is a specification.

My invention has relation to certain improvements in carriage-springs, and particularly to that class known as "side" springs.

An object of the invention is to provide a carriage-spring and coupling therefor that will be simple in construction and composed of a minimum number of durable and inexpensive parts.

With this and other objects in view the invention consists in certain novel features of construction and in combinations and arrangements of parts, as will be more fully hereinafter described, and afterward specifically pointed out in the claims.

Referring to the accompanying drawings, illustrating my invention, Figure 1 is a perspective view showing my improvement in operative position. Fig. 2 is a top plan view. Fig. 3 is a side elevation showing the springs coupled together. Fig. 4 is a perspective view of one of the couplings. Fig. 5 is a longitudinal sectional view of one of the couplings. Fig. 6 is a transverse sectional view showing the manner of securing the springs within the couplings and the couplings to the axle-blocks. Fig. 7 is a detail perspective view showing the bearing-block to which the ears of the couplings are pivoted. Fig. 8 is a perspective view of a portion of my device hereinafter described, and Fig. 9 is a cross-section on line 3 3 of Fig. 3.

The same letters of reference will indicate like parts wherever they occur throughout the different views.

In the practical embodiment of my invention I have shown a vehicle A, the same being provided with the usual axles and wheels. B indicates the cross-bars, secured to the under side of the body portion of the vehicle, the outer ends thereof being provided with shackles C, as shown.

D, E, and F are the spring-leaves, D being the lower and supporting leaf, which at its rear end is provided with longitudinal slot N. Said springs D, E, and F are secured together at their longitudinal center by a bolt G, the several springs being apertured for the passage of said bolt, upon which they are bound by a suitable nut. In connection with the shackles C, I provide depending bolts H, said bolts being screw-threaded and provided with nuts H', by means of which the shackles may be secured to the outer end of the cross-bars B. I also provide a spring-strip I, as shown in Fig. 8, having each of its ends I' turned upwardly, so as to form right angles with the balance of the plate, and having in its longitudinal center an aperture J. The said portion I is adapted to extend from one shackle C to another, the bolt G passing through the aperture J. The object of said plate is to reinforce the springs D, E, and F, and it is placed upon them with its convexed surface turned downwardly, one of its ends being inserted in one of the shackles C and the other end in the opposite shackle, in which position, after the shackles C are contracted by means of the screw-bolts H, the said portion J will have its curvature reversed, so as to lie flatly upon the spring F. The said portion I should be constructed of metal equally resilient as that from which the springs are made.

The rear ends of the spring D are formed with longitudinal slots N therein for the purpose hereinafter explained.

I next provide bearing heads or blocks R, two of which are secured to the forward bolster P and two to the rear bolster P'. The said bearing-heads R are constructed with an interior recess T of suitable dimensions to allow the sliding back and forth therein of the end of spring D, or, if preferred, there may be reinforcing or thickening portion secured upon the ends of said spring which pass into said block. The said block R is provided with a vertical aperture W and with two depending ears S, provided with suitable apertures M for the passage therethrough of a rivet S', this being the means by which said heads R are secured upon the bearing-heads O upon the bolster, said bearing-heads O being provided with apertures O', registering with the apertures M in the ears S. Said heads O are secured upon the bolster by means of depending bolts Y, which are screw-threaded and provided with suitable nuts Z. The ends of the spring D are confined within the heads R by means of stop-pins V, passing through the apertures W and through the slots U, said slots affording the springs sufficient play in their sliding action. The upper surfaces of the head R are preferably cut away, as shown at T', so that the upper surfaces of the springs D in sliding back and forth within the heads will not come in contact therewith, so as to continually abrade the said springs.

The employment of the portion I is very important in my invention for the reason that said portion when in place is sprung in a direction opposite to the normal curvature of the springs, so that its resiliency will be imparted to each of the three leaf-springs below it, while at the same time it will serve to combine the action and resiliency of all of said springs. A further effect of the portion I will be to prevent the upward movement of the springs between the shackles C, said portion I having a tendency, by means of its being sprung reversely of its curvature, to depress the other springs downwardly.

The forward ends of the springs D do not slide back and forth within the heads R, but are confined therein by means of suitable rivets L, so that the play of the springs is confined to the longitudinal extent of the slots N. The sliding ends of the springs D rest upon a plate D', secured within the head R. This plate should be constructed of steel or very hard iron, so that the wear upon it by the springs will not be appreciable.

Having thus fully described my invention, what I claim as new, and desire to secure by Letters Patent of the United States, is—

1. The combination with the side springs suitably secured to the body of a vehicle, of the lower supporting-leaf having its front end rigidly secured in a socket-piece pivoted to the front bolster, and its rear end adapted to slide loosely in a socket-piece pivoted to the rear bolster, a longitudinal slot provided in said rear end, a bolt secured in the socket-piece and passing through said slot, and a hardened bearing-plate interposed between said spring and the bottom of the socket-piece, substantially as described.

2. The combination with the spring provided with a longitudinal slot in its end, of a socket-piece adapted to receive the same, a bolt secured in said socket-piece and passing through the slot in the said spring, downwardly-projecting ears provided on the sides of said socket-piece, adapted to embrace a head pivotally secured to the vehicle-bolster and secured thereto by a bolt, substantially as described.

3. The combination with the spring provided with a longitudinal slot in its end, of a socket-piece adapted to receive the same, a bolt secured in said socket-piece and passing through the slot in the said spring, downwardly-projecting ears provided on the sides of said socket-piece, adapted to embrace a head pivotally secured to the vehicle-bolster and secured thereto by a bolt, and a cut-out portion provided in the front top end of the socket-piece for the purpose set forth.

WILLIAM SCHUBERT.

Witnesses:
 JOHN REIDY,
 FRANK TORKE.